No. 690,494. Patented Jan. 7, 1902.
S. W. WARDWELL.
EXPANSION PULLEY.
(Application filed July 30, 1901.)
(No Model.)

WITNESSES

INVENTOR
BY
ATTORNEYS.

UNITED STATES PATENT OFFICE.

SIMON W. WARDWELL, OF PROVIDENCE, RHODE ISLAND, ASSIGNOR TO UNIVERSAL WINDING COMPANY, OF PORTLAND, MAINE, A CORPORATION OF MAINE.

EXPANSION-PULLEY.

SPECIFICATION forming part of Letters Patent No. 690,494, dated January 7, 1902.

Application filed July 30, 1901. Serial No. 70,254. (No model.)

*To all whom it may concern:*

Be it known that I, SIMON W. WARDWELL, a citizen of the United States, residing at Providence, in the county of Providence and State of Rhode Island, have invented certain new and useful Improvements in Expansion-Pulleys, of which the following is a specification.

My invention relates to expansion-pulleys, and more particularly to that class wherein there is used a continuous elastic split spring-ring which forms the rim of the pulley and which is constructed, arranged, and mounted upon suitable devices whereby the ring may be expanded or contracted, the object of the invention being to provide an improved pulley which is simple and effective in construction and well adapted for the purposes intended; and to these ends it consists in the various features of construction and arrangement of parts having the general mode of operation substantially as hereinafter more particularly set forth.

Figure 3:
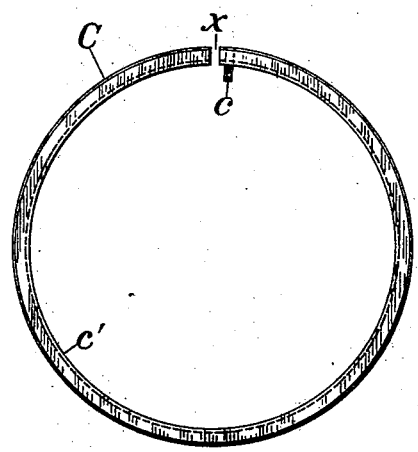
Figures 1, 2:
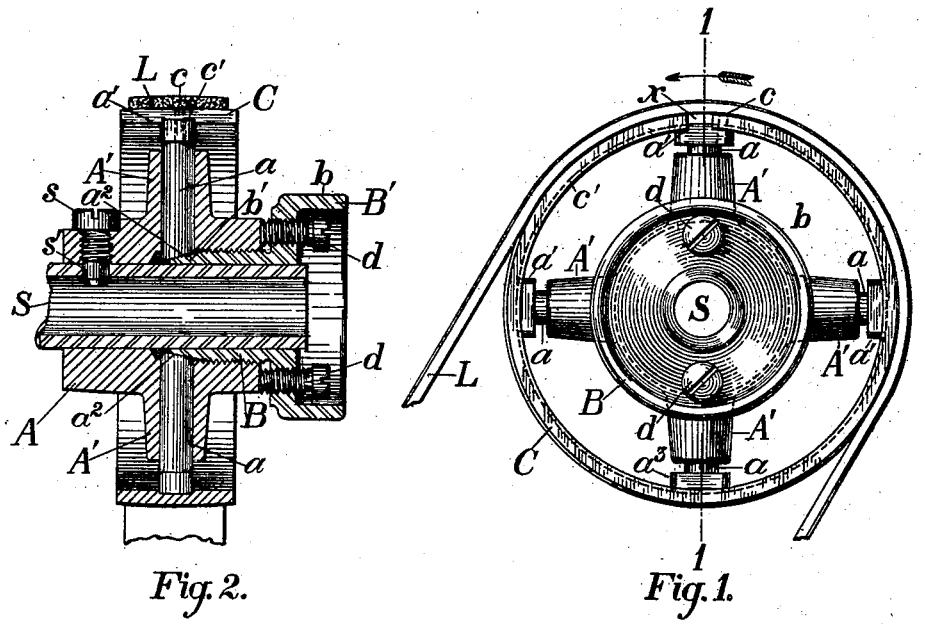

Referring to the accompanying drawings, Figure 1 is a side view of a pulley embodying my invention. Fig. 2 is a vertical transverse section on the line 1 1, Fig. 1; and Fig. 3 is a side view of the elastic split ring.

My pulley consists of a sleeve or hub portion A, with radial arms or projections A', bored to receive the radially-projecting plungers $a$. The center of the hub is bored at one end to fit the shaft S, on which the pulley is mounted, being secured thereto by suitable means. As shown in Fig. 2, a screw $s$ extends radially into said hub, having a projection $s'$, adapted to fit a corresponding bore in the shaft. The opposite end of the hub portion A is bored to larger diameter and threaded internally to receive the sleeve or member B. The latter is also bored to fit the shaft S, besides being fitted to the internally-screw-threaded portion of the hub A. The end of the member B which enters the hub A is tapered externally at $b'$ and against this tapered portion the beveled ends $a^2 a^2$, &c., of the plungers $a$ $a$, &c., bear. By advancing the member B into the hub A the plungers $a$ $a$, &c., are forced uniformly and radially outward from the axis of the pulley. By withdrawing the member B the plungers are permitted to return uniformly radially inward toward the axis of the pulley.

Upon the outer extremities $a'$ of the plungers $a$ $a$, &c., is supported the continuous elastic split ring C, which forms the rim of the pulley. The extremities $a'$ of the plungers are of rectangular section to fit the rectangular groove cut in the inner surface of the ring to prevent the latter from lateral displacement. The groove further serves to retain the plungers $a$ $a$, &c., in correct position to prevent their rotation in the projections A' and insure that they shall properly present their beveled extremities to the tapered end $b'$ of the member B. To prevent it from slipping rotatively, the ring C is secured to one of the plungers $a$ by a pin $c$, located adjacent the split $x$. The relation between the pin $c$ and the opening $x$ must be such that the pull or the resistance of the belt in transmitting power shall cause a pull on the ring C from the pin $c$. In other words, the expansible pulley must rotate in the direction of the arrow, Fig. 1, with pin $c$ following the split $x$, when the pulley serves as a driver to transmit power from the shaft S, on which it is supported, through the belt L to a second shaft; but when driven by the belt L it must rotate in the opposite direction, with the pin $c$ leading the split $x$. If this rule is not observed, the friction of the belt on the ring will cause the free end of the ring to slip and the ring to distend.

The member B is formed with a handle portion B', of which the peripheral surface $b$ may be knurled to present a more effective handhold. To lock the member B in its place after adjustment, two screws $d$ $d$ are provided, which pass through the bottom of the cup-shaped recess and bear against the hub A. By tightening these screws against the end of the hub, as described, rotation of the member B is prevented by the increased frictional resistance between the screw-threads of the members A and B and also by the friction of the ends of the screws $d$ $d$ on the end of the hub A.

The cup form of the handle portion B' serves to cover and protect the heads of the screws $d\ d$, so that they may not catch the person or clothing of the operator when rotating at high speed.

To adjust the pulley, it is therefore only necessary to loosen the screws $d\ d$ to relieve the friction at the points noted and then rotate the adjustable member B in the appropriate direction to cause expansion or contraction of the diameter of the pulley. By rotating the member B to advance it into the member A the plungers $a\ a$, &c., are forced radially outward, expanding the ring C. By rotating to withdraw it from the plungers $a\ a$ the latter are permitted to recede radially under the elastic contraction of the ring C. When the diameter of the ring has been appropriately adjusted, the two binding-screws $d\ d$ are tightened to secure the member B in position to insure that the ring C shall maintain its correct diameter, as above set forth.

The above-described expansible pulley possesses great advantages over existing structures devised for the same purpose. The flat ring C, of substantially rectangular section, is more effective than rings of triangular section, which have heretofore been employed. Owing to the thinness of the section in the direction of bending, the ring can be expanded with less exertion and, further, will retain its elasticity for a greater length of time, as the strain on the metal is less than in a ring of deep section.

A further advantage arises from the fact that the ring or rim C is expanded directly radially from the axis of the pulley without the longitudinal movement along the axis, which occurs in some pulleys.

Pulleys which comprise in their structure an expansible ring of triangular section are of necessity so constructed that the principal resistance to adjustment is at the rim, combining direct resistance to expansion in the ring with the frictional resistance between the ring and the bevel-edged disks which act to expand the ring. In my improved structure this frictional resistance is brought so close to the shaft that the operator has an advantage of leverage, due to the small diameter of the surface at which this frictional resistance occurs as compared with the diameter of the handle portion of the sleeve B, by which the ring is expanded.

Without limiting myself to the precise details of structure above described, I claim as my invention—

1. The combination in an expansible pulley, with a sleeve adapted to be fastened on a shaft, of hollow arms radiating from said sleeve, plungers adapted to fit the openings in said arms, a continuous split spring-ring supported by the plungers and fastened to one of them, and means for forcing the plungers radially away from the axis of the pulley to expand the ring, substantially as described.

2. The combination in an expansible pulley, with a sleeve supported by the shaft, of radial arms on said sleeve, plungers fitting bores in said arms, a continuous, elastic, split ring supported by said plungers concentric with the shaft of the pulley, means for forcing the plungers outward to expand the ring, and a device for securing them in position to retain the ring expanded, substantially as described.

3. The combination in an expansible pulley, with a continuous, elastic, split ring having a substantially flat outer surface for receiving the belt, of arms supported by a sleeve on the shaft, plungers adapted to radial holes in the arms and supporting the ring, and a sleeve adjustable longitudinally of the shaft to engage said plungers to force them out to expand the ring, substantially as described.

4. The combination with a continuous, elastic, split ring for a pulley-rim, of an arm-bearing sleeve, plungers adapted to radial holes in the arms, means for connecting the ring to be supported and retained by the plungers, a second sleeve adjustable longitudinally in relation to the first to engage the plungers to vary the diameter of the ring, and means for clamping it in position to retain the ring at the diameter to which it has been adjusted, substantially as described.

5. The combination in an expansible pulley, with a continuous, elastic split ring, of radially-movable plungers supporting the same, a sleeve A having arms radiating therefrom to guide the plungers, a second sleeve B, longitudinally adjustable in relation to the first, and having a tapered section, to engage the correspondingly-tapered extremities of the plungers to force them out to expand the ring, substantially as described.

6. The combination in an expansible pulley, with a continuous, elastic, split ring, of a sleeve having extending arms and radial bores in said arms, plungers adapted to fit said bores to support the ring, and having beveled inner ends, a second sleeve having a correspondingly-beveled surface, means for adjusting the second sleeve to engage the beveled surfaces to project the plungers to expand the ring, and means for clamping said sleeve in position to retain the ring expanded, substantially as described.

7. The combination in an expansible pulley, of a sleeve adapted to be fastened on a shaft, extending arms on said sleeve, plungers fitting radial bores in the arms, a split ring supported by the plungers concentric with the shaft of the pulley, a tapered sleeve adjustable to engage the plungers to expand the ring, a handle-nut-formed portion of said sleeve, and a screw or screws projecting through said nut portion to engage the first sleeve to clamp the second in position, substantially as described.

8. The combination in an expansible pulley with an arm-supporting sleeve, of plungers projecting from said arms and having flat-sided portions, a split ring supported thereby to receive the belt, with an internal annular groove in said ring, adapted to engage the flat-sided portions of the plungers to retain the ring longitudinally and to prevent said plungers from turning in the arms, and means for forcing the plungers outward to expand the ring, substantially as described.

9. The combination in an expansible pulley, with a split ring, of a sleeve with extending arms, radially-projecting plungers in the arms supporting the ring, and having beveled inner extremities, and a second sleeve having a beveled extreme portion and an externally-threaded section to engage an internally-threaded portion of the first sleeve to adjust the second sleeve longitudinally on the shaft to force the plungers outward by the engagement of the beveled surfaces, substantially as described.

10. The combination in an expansible pulley with a sleeve A, serving as a hub to support the arms, and an internally-threaded portion of said sleeve, of a second sleeve B threaded externally to engage said portion, plungers operating radially in the arms of sleeve A, and having beveled surfaces to engage a corresponding bevel on sleeve B, a split ring supported by said plungers, a handle to operate the plungers consisting of an overhanging portion of sleeve B, and a screw or screws projecting through and protected by said overhanging portion to engage sleeve A to clamp sleeve B in position, substantially as described.

In testimony whereof I have signed my name to this specification in the presence of two subscribing witnesses.

SIMON W. WARDWELL.

Witnesses:
ARTHUR A. ARMINGTON,
CHARLES A. EDDY.